(12) United States Patent
Van Den Berghe

(10) Patent No.: US 7,488,378 B2
(45) Date of Patent: Feb. 10, 2009

(54) DEVICE FOR SEPARATING OIL FROM AN OIL-AIR SEPARATOR OF AN OIL RESERVOIR

(75) Inventor: Pieter Van Den Berghe, Aartselaar (BE)

(73) Assignee: Atlas Copco Airpower, naamloze vannootschap, Wilrijk (BE)

( * ) Notice: Subject to any disclaimer, the term of this patent is extended or adjusted under 35 U.S.C. 154(b) by 91 days.

(21) Appl. No.: 11/667,298

(22) PCT Filed: Nov. 3, 2005

(86) PCT No.: PCT/BE2005/000153

§ 371 (c)(1),
(2), (4) Date: May 8, 2007

(87) PCT Pub. No.: WO2006/047838

PCT Pub. Date: May 11, 2006

(65) Prior Publication Data

US 2008/0092959 A1 Apr. 24, 2008

(30) Foreign Application Priority Data

Nov. 8, 2004 (BE) .................................. 2004/0542

(51) Int. Cl.
*B01D 46/42* (2006.01)
(52) U.S. Cl. .................. 96/408; 55/DIG. 19; 55/385.3; 55/423; 96/411; 137/107; 184/6.24
(58) Field of Classification Search ............ 55/DIG. 19, 55/355, 385.3, 417, 420, 423; 96/180, 219, 96/264, 397, 408, 411; 137/107, 197; 184/6.24; 210/136, 188, 418, 436, 472

See application file for complete search history.

(56) References Cited

U.S. PATENT DOCUMENTS 4,878,923 A * 11/1989 Muller ........................ 55/355

(Continued)

FOREIGN PATENT DOCUMENTS

EP 0 719 910 A1 7/1996

(Continued)

*Primary Examiner*—Duane S Smith
*Assistant Examiner*—Sonji Turner
(74) *Attorney, Agent, or Firm*—Bacon & Thomas, PLLC

(57) ABSTRACT

Device for separating oil from the air-oil separator of an oil reservoir, which device comprises a line (3) for the air-oil separator which is connected to the above-mentioned oil reservoir (1) with one far end and in which is provided a suction pump (4) for sucking in air, and whereby the other far end of the above-mentioned line (3) is connected to a filter (7) which is provided in a chamber (8) which is connected to the above-mentioned oil reservoir (1) by means of a return line (9), and which chamber (8) is provided with an outlet (10) to the environment, characterised in that a non-return valve (12) is provided in a the above-mentioned return line (9) which lets an air flow pass from the oil reservoir (1) to the chamber (8), and which prevents an air flow in the opposite direction, and whereby this non-return valve is provided with a small flowback opening (16) which allows the oil which has been separated in the chamber (8) by the filter (7) to flow back to the oil reservoir (1).

10 Claims, 3 Drawing Sheets

U.S. PATENT DOCUMENTS

| | | | |
|---|---|---|---|
| 4,886,019 A | | 12/1989 | Davis et al. |
| 5,011,388 A | * | 4/1991 | Aoki et al. .................... 418/95 |
| 5,406,976 A | * | 4/1995 | Bekki ...................... 137/513.3 |
| 5,681,372 A | * | 10/1997 | Magits ........................ 95/273 |
| 5,718,744 A | * | 2/1998 | Ehlert ......................... 96/189 |
| 6,723,149 B2 | * | 4/2004 | Ernst et al. .................... 55/498 |
| 7,059,311 B2 | * | 6/2006 | Prasad ........................ 123/573 |

FOREIGN PATENT DOCUMENTS

| | | | |
|---|---|---|---|
| EP | 719910 A1 | * | 7/1996 |

* cited by examiner

DEVICE FOR SEPARATING OIL FROM AN OIL-AIR SEPARATOR OF AN OIL RESERVOIR

The invention concerns a device for separating oil from the de-aeration of an oil reservoir, which device is of a known type which comprises a de-aeration line which is connected with one far end to the above-mentioned oil reservoir and in which is provided a suction pump for sucking in air, and whereby the other far end of the above-mentioned line is connected to a filter which is provided in a chamber which is connected to the above-mentioned oil reservoir by means of a return line, and which chamber is provided with an outlet to the environment.

An example of an oil reservoir which can be equipped with such a device is for example the crankcase of the gear box of an oil-free compressor.

The de-aeration of an oil reservoir, such as the de-aeration of the crankcase of a compressor, is full of oil aerosols, dispersion aerosols as well as condensation aerosols. If the crankcase de-aeration opened directly into the atmosphere, air with oil could be sucked into the compressor. The compressor and especially the cooling system could be polluted by the oil. Hence the use of devices for separating oil from the de-aeration of the crankcase.

In such known devices, air with oil-aerosols is pumped through the above-mentioned line to the filter by means of the above-mentioned suction pump, where air and oil are separated. The separated oil flows via the above-mentioned return line back into the oil reservoir, where the purified air is blown into the environment via the outlet.

From BE 1.009.008 is known such a device for separating oil from the de-aeration of an oil reservoir, whereby a certain flow rate of purified air is blown into the environment through the above-mentioned outlet.

In practice, however, it appears that, despite the presence of the above-mentioned filter, oil-polluted air will flow through the above-mentioned outlet from the oil reservoir into the ambient air.

Thorough research has proven that this phenomenon is due to the fact that hot, rising oil vapours and/or oil aerosol end up in the above-mentioned chamber via the above-mentioned return line and pollute the purified air again.

The present invention aims to remedy one or several of the above-mentioned and other disadvantages and to provide a simple device which makes it possible to filter polluted air more efficiently and to separate the oil therefrom.

To this end, the present invention concerns a device of the above-mentioned type, whereby a non-return valve is provided in the above-mentioned return line which lets an air flow pass from the oil reservoir to the chamber, and which prevents an air flow in the opposite direction, and whereby this non-return valve is provided with a small flow-back opening which allows the oil which has been separated in the chamber by the filter to flow back to the oil reservoir.

Since the above-mentioned suction pump always sucks in an air delivery from the above-mentioned oil reservoir, there is always a slight underpressure in the oil reservoir, as a result of which the above-mentioned non-return valve is maintained in a closed position.

In this closed position, it is still possible for oil to flow back through the above-mentioned flow-back opening from the chamber to the oil reservoir, but oil vapours or oil aerosols are prevented from flowing from the oil reservoir to the chamber and ending up in the environment.

To this end, the flow-through section of the above-mentioned flow-back opening is preferably dimensioned such that it behaves as a closed channel which is constantly filled with oil flowing back from the filter to the oil reservoir, and consequently it will prevent vapours from escaping from the oil reservoir via said flow-back opening. The oil which flows back to the oil reservoir is sucked in as a result of the slight underpressure prevailing in the oil reservoir.

Should the above-mentioned suction pump fall out or should the line get obstructed, the pressure in the oil reservoir will rise, as a result of which the non-return valve is forced into an open position, and the air will flow from the oil reservoir via the return line and the chamber, through the outlet into the environment. This air is then brought into the environment in a non-purified manner, but oil is prevented from getting into the compressed air of the oil-free compressor.

The above-mentioned non-return valve preferably consists of a fixed part and a moving part, whereby the above-mentioned flow-back opening is provided in the moving part.

An advantage of such a non-return valve is that it has a very simple construction and that it allows an oil flow to easily pass from the chamber to the oil reservoir through the above-mentioned flow-back opening in a first, closed condition of use, and that it lets the air flow pass from the oil reservoir to the chamber in a second, opened condition of use.

In order to better explain the characteristics of the invention, the following preferred embodiments of a device for separating oil from the de-aeration of an oil reservoir are described with reference to the accompanying drawings, in which:

FIG. 1 schematically represents an oil reservoir upon which has been mounted a device according to the invention for separating oil from the de-aeration;

FIG. 3 represents a practical embodiment of a device according to the invention;

Figure 1:
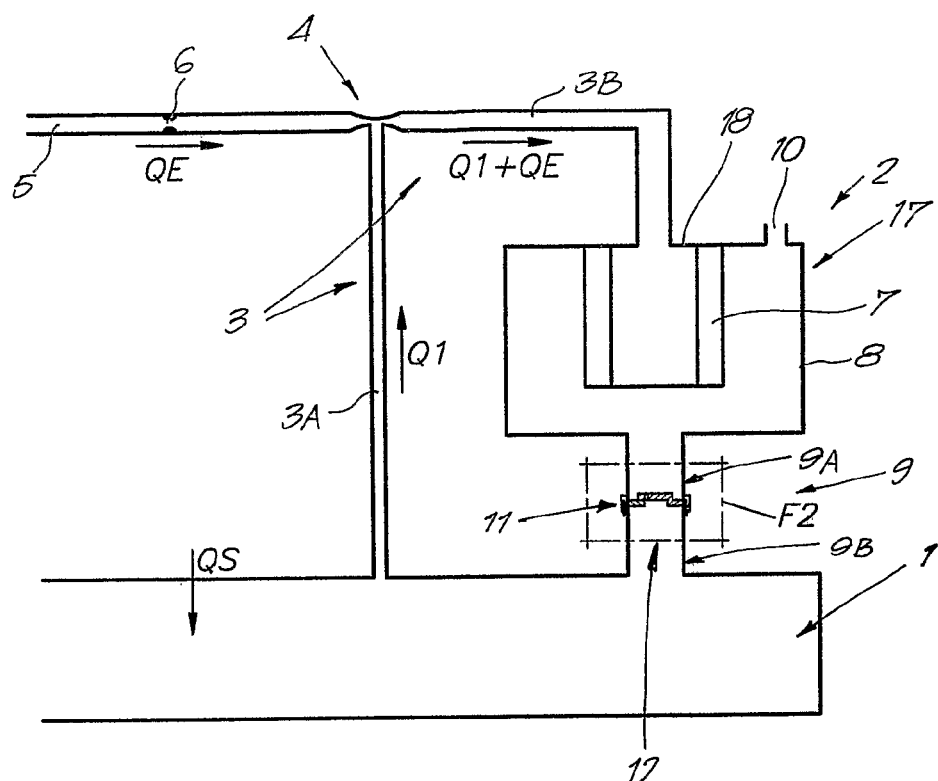

FIG. 1 schematically represents an oil reservoir 1, for example a crankcase of the gear-wheel drive of an oil-free compressor, which is provided with a device 2 according to the invention.

This device 2 comprises a line 3 for the de-aeration which consists of two parts 3A and 3B, whereby the first line part 3A is connected to the above-mentioned oil reservoir 1 and whereby a suction pump 4 has been provided between both parts 3A and 3B.

The above-mentioned suction pump 4 is in this case formed of a venturi tube onto which the line 3A is connected in the constriction, whereas the line 3B is connected to the outlet of the venturi tube, and whereby a compressed air line 5 is connected to the inlet of the venturi tube.

The compressed air line 5 is part of a compressed air network which is not represented in the figures and which is fed with the compressed air of the compressor or another compressed air source. In this compressed air line is in this case mounted a restrictor or pressure regulator 6, upstream the ejector.

An advantage of the use of such an ejector, is that it has no moving parts and thus is not liable to wear.

The second line part 3B of the line 3 connects the pressure side of the above-mentioned suction pump 4 to a standing, annular filter 7 which has been mounted vertically and which is made of a spongy material which collects oil in the form of an aerosol from the air, flowing from the inside to the outside through the filter wall, and in which fine drops stick together, such that larger oil drops are formed which trickle down along the outside of the filter 7.

The above-mentioned filter 7 is provided in a chamber 8 which is connected to the above-mentioned oil reservoir 1 by means of a return valve 9 and which is also provided with an outlet 10 to the environment.

Figure 2:
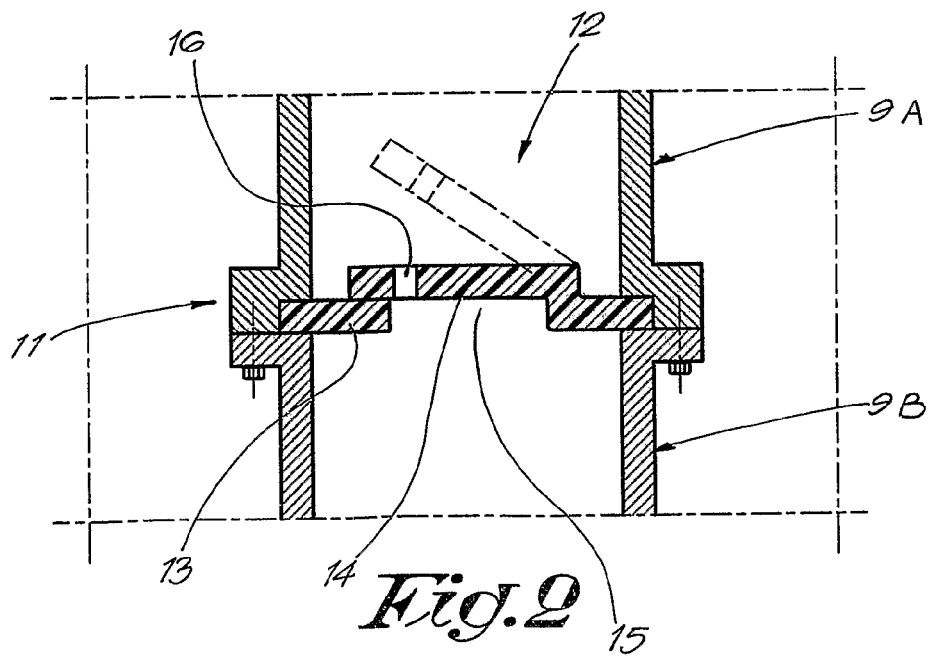
FIG. 2 represents the part indicated in FIG. 1 by F2 to a larger scale.

As is represented in greater detail in FIG. 2, the above-mentioned return line 9 consists of two parts 9A and 9B, more particularly a first part 9A which is connected to the above-mentioned chamber 8 and a second part 9B which is connected to the above-mentioned oil reservoir 1, which are connected to each other by means of a flanged joint 11.

According to the invention, a non-return valve 12 is provided in the above-mentioned return line 9 which mainly consists of a fixed part 13 which is clamped between the above-mentioned flanged joint 11, either or not partially, and which provides for a sealing of said flanged joint; and of a moving part 14 which is hinge-mounted to the above-mentioned fixed part 13.

In the above-mentioned fixed part 13 is provided a first opening 15 which can be sealed by means of the above-mentioned moving part 14.

In the moving part 14 is provided a small flow-back opening 16 which is smaller than the above-mentioned first opening 15 in the fixed part 13 of the non-return valve 12, and which, when the non-return valve 12 is closed, always forms a passage from the chamber 8 to the oil reservoir 1.

The working of the device 2 according to the invention is very simple and as follows.

When the ejector is being fed by the compressed air line 5 with a flow rate QE of compressed air via the pressure regulator 6, a certain flow rate Ql of oil-polluted air will be sucked over the first part 3A of the line 3 from the oil reservoir 1.

The dimensions of the device have been selected such that this flow rate Ql is a little larger than the normal crankcase de-aeration flow rate QS, namely the flow rate which is brought into the oil reservoir 1 via components of the compressor and especially via the sealings around the rotor shaft.

As a result, a slight and almost constant underpressure will constantly prevail in the oil reservoir 1.

As a result, the moving part 14 of the non-return valve 12 is sucked against the fixed part 13 so that it is situated in its first, closed condition of use.

In the ejector, the oil-polluted air is mixed with the compressed air, and the common flow rate QE+Ql is sent via the second part 3B of the line 3 through the filter 7, after which the purified air escapes via the outlet 10 into the environment, namely at a flow rate which is equal to QE+Ql.

The oil drops which are formed in the filter 7 trickle down the filter 7 and are carried back into the oil reservoir 1 by the gravitational force over the return line 9 and through the flow-back opening 16 in the moving part 14 of the non-return valve 12. The prevailing underpressure in the oil reservoir 1 also helps the oil flow through the flow-back opening 16.

The dimensions of the above-mentioned flow-back opening 16 in the moving part 14 are hereby made such that this flow-back opening 16 is constantly filled with oil which flows back from the filter 7 to the oil reservoir 1, such that this flow-back opening 16 is sealed by the flow of oil which flows back, as a result of which air with oil vapours cannot get into the chamber 8 via this flow-back opening 16.

When the de-aeration of the crankcase fails, for example because the compressed air in the compressed air line 5 falls out, a slight overpressure will be created in the oil reservoir 1 as a result of the crankcase de-aeration flow rate QS leaking out to the oil reservoir 1, which overpressure forces the above-mentioned non-return valve 12 in a second, open position of use, as is represented by means of the dashed line in FIG. 2, such that polluted air is discharged into the environment via the return line 9 and the chamber 8 along the outlet 10.

FIG. 3 represents a practical embodiment of a device 2 according to the invention, whereby parts with the same function have the same figures of reference as in the preceding figures.

In this embodiment, the filter 7 is provided in a filter housing 17 which is provided against the oil reservoir 1 and forms the chamber 8, whereby the filter housing 17 is sealed by a removable filter lid 18 in which the above-mentioned suction pump 4 in the shape of a venturi tube has been provided, and whereby the line parts 3A and 3B are formed of inner, connecting bores in the filter housing 17 and in the filter lid 18 respectively.

The above-mentioned non-return valve 12 is in this case made of a sealing material, such as for example an elastomer such as rubber, and forms a sealing between the filter housing 17 and the oil reservoir 1 which is clamped in a recess between both parts.

This non-return valve 12 is provided with a second opening 19 which forms a passage for the air which is sucked in from the oil reservoir 1 via the above-mentioned line 3A by the suction pump 4, and which is forced out via the line 3B in the filter housing 17, through the filter 7 and the outlet 10.

The oil which is separated by the filter 7 is collected at the bottom of the filter housing 17 and is carried back to the oil reservoir 1 via the return line 9 and the flow-back opening 16 in the non-return valve 12 in this return line 9.

Figure 5:
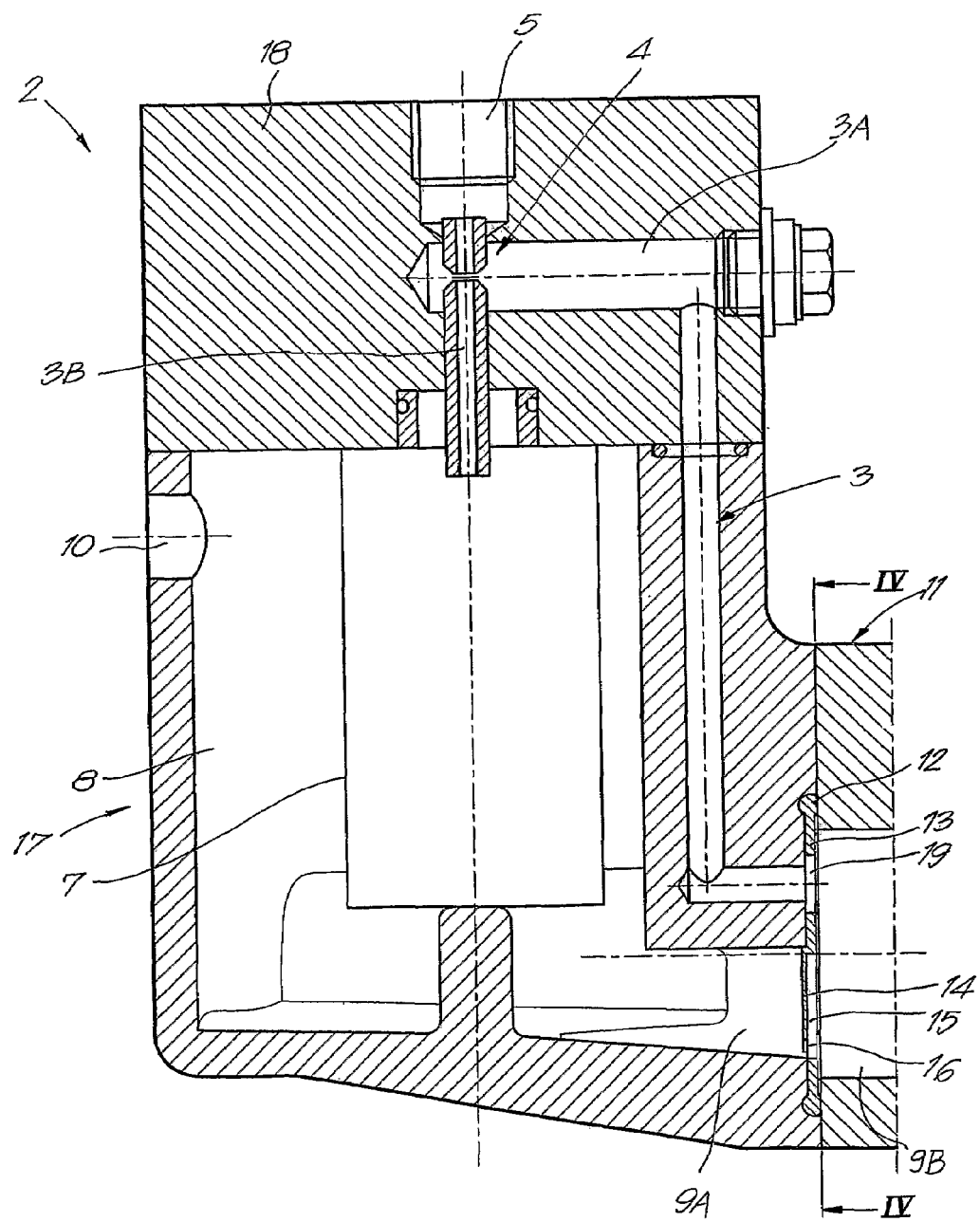
FIG. 5 represents a section according to arrow V-V in FIG. 4.
Figure 4:
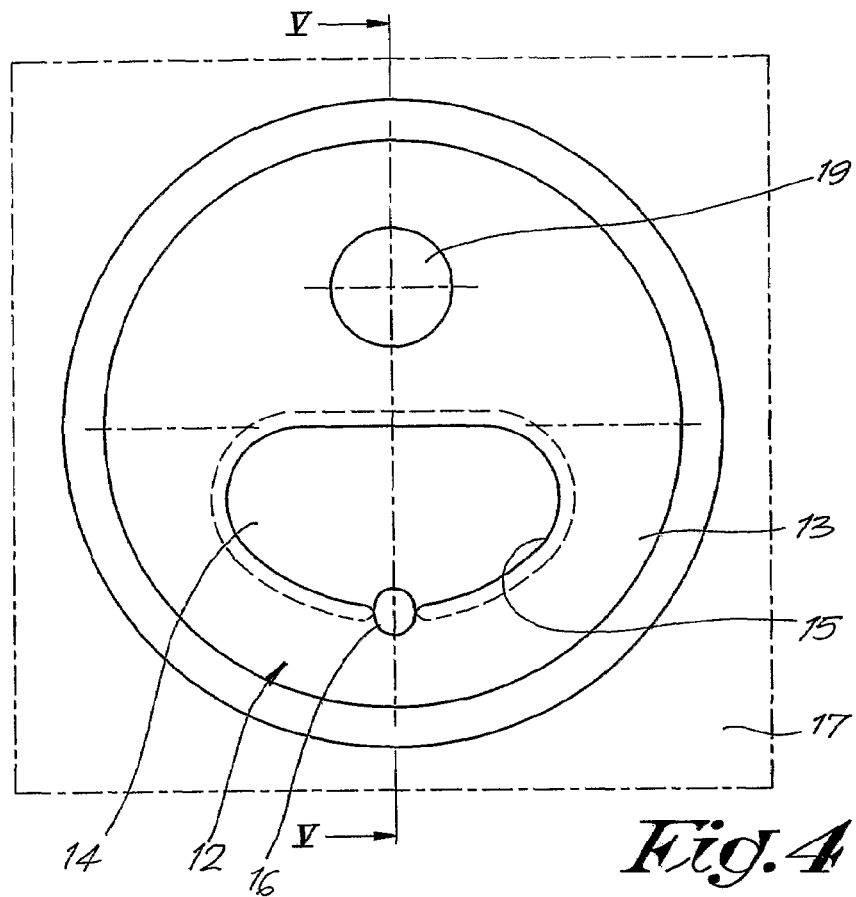
FIG. 4 represents a section according to arrow IV-IV in FIG. 3.
Figure 5:
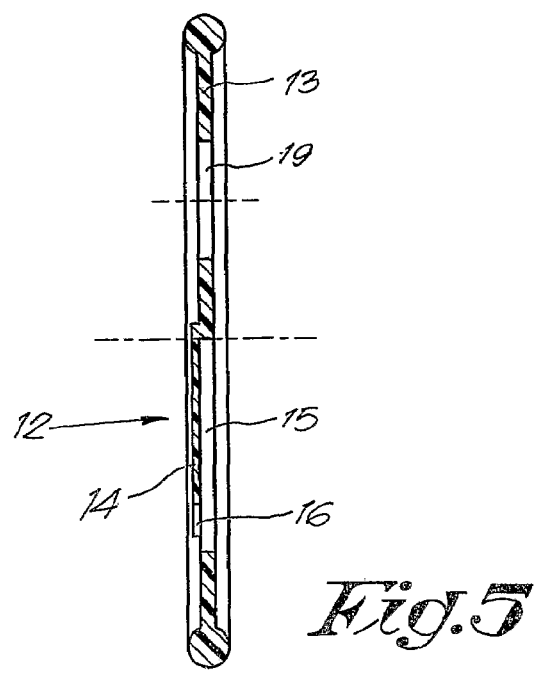

As is shown in the detailed FIGS. 4 and 5 of the above-mentioned non-return valve 12, the above-mentioned moving part 14 is in this case made in one piece with the above-mentioned fixed part 13.

It is clear that the above-mentioned suction pump 4 can be made in different ways, in the shape of several types of pumps, such that the presence of a compressed air line is not necessary.

It is also clear that the presence of a pressure regulator 6 in the compressed air line 5 is not strictly necessary.

According to the invention, the above-mentioned filter can be made in many ways and it is not restricted to a standing annular filter as described above.

It is clear that the above-mentioned first opening 15 can be provided in the above-mentioned fixed part 13 instead of in the moving part 14.

Naturally, a device according to the invention cannot merely be applied to the crankcase of an oil-free compressor, but it can also be applied to other oil reservoirs.

The present invention is by no means limited to the embodiment described above and represented in the accompanying drawings; on the contrary, such a device for separating oil can be made in all sorts of variants while still remaining within the scope of the invention.

The invention claimed is:

1. Device for separating oil from the an air-oil separator of an oil reservoir, comprising a line for the an air-oil separator which is connected to the oil reservoir at one far end and in which is provided a suction pump for sucking in air, and wherein the other far end of the line is connected to a filter which is provided in a chamber which is connected to the oil reservoir by means of a return line, said chamber being provided with an outlet to the environment, and wherein a non-return valve is provided in the return line which permits air flow from the oil reservoir to the chamber, and prevents air flow in the opposite direction, and further wherein the non-return valve is provided with a small flow-back opening which enables the oil which has been separated in the chamber by the filter to flow back to the oil reservoir.

2. Device according to claim 1, wherein the non-return valve comprises a fixed part and a moving part, wherein at least one first opening is provided in the fixed part which is sealable by the moving part.

3. Device according to claim 2, wherein the flow-back opening is provided in the moving part.

4. Device according to claim 2, wherein the non-return valve is made in one-piece.

5. Device according to claim 2, wherein the non-return valve is made from a sealing material.

6. Device according to claim 5, wherein the non-return valve is made in the form of a seal.

7. Device according to claim 6, wherein the return line comprises a first part which is connected to the chamber and a second part which is connected to the oil reservoir; and wherein the first and second parts are connected to each other by means of a flanged joint in between which the non-return valve is provided.

8. Device according to claim 2, wherein a second opening is provided in the fixed part adjacent the moving part.

9. Device according to claim 8, wherein the second opening is provided between the line and the oil reservoir.

10. Device according to claim 1, wherein the dimensions of the flow-back opening are such that, when in use, the flow-back opening is constantly filled with oil which is separated from the filter and which oil flows back to the oil reservoir via the flow-back opening.

* * * * *